June 25, 1946.  W. J. WILLIAMS  2,402,933
ELECTROMAGNETIC MOTOR AND CIRCUIT CONTROLS THEREFOR
Filed May 20, 1943  4 Sheets-Sheet 1

INVENTOR
WILLIAM J. WILLIAMS
BY
Edmund B Whitcomb

June 25, 1946.  W. J. WILLIAMS  2,402,933
ELECTROMAGNETIC MOTOR AND CIRCUIT CONTROLS THEREFOR
Filed May 20, 1943   4 Sheets-Sheet 2

INVENTOR
WILLIAM J. WILLIAMS
BY
Edmund B Whitcomb

June 25, 1946.  W. J. WILLIAMS  2,402,933
ELECTROMAGNETIC MOTOR AND CIRCUIT CONTROLS THEREFOR
Filed May 20, 1943  4 Sheets-Sheet 3

INVENTOR
WILLIAM J. WILLIAMS
BY
Edmund B Whitcomb

June 25, 1946.  W. J. WILLIAMS  2,402,933
ELECTROMAGNETIC MOTOR AND CIRCUIT CONTROLS THEREFOR
Filed May 20, 1943  4 Sheets-Sheet 4

INVENTOR
WILLIAM J. WILLIAMS
BY
Edmund B Whitcomb

Patented June 25, 1946

2,402,933

UNITED STATES PATENT OFFICE 2,402,933

ELECTROMAGNETIC MOTOR AND CIRCUIT CONTROLS THEREFOR

William J. Williams, Chicago, Ill.

Application May 20, 1943, Serial No. 487,790

9 Claims. (Cl. 172—240)

This invention relates to electrical apparatus, to a system of control and to means for governing the actuation of a prime mover or other power developing unit and more particularly to a novel electro-mechanical mechanism operating in a step by step manner, and a manually controllable, automatically operating regulating system therefor adapted for various uses in mechanical organizations, and is a continuation of the common subject matter of my copending application entitled "Automatic controlling systems for engines," bearing Serial No. 393,574, filed May 15, 1941, now Patent Number 2,319,835, dated May 25, 1943.

The invention contemplates an improved step-up mechanism for transmitting motion to any load in which a change from electrical to mechanical energy is very effectively accomplished. Thus, the invention has for one of its objects the provision of an electrically responsive actuating mechanism embodying a novel force multiplying means for effectively transmitting motion.

The invention comprehends a system of control including electro-mechanical means for regulating the operation, for example, of Diesel and other types of engines, whereby the engine may be actuated at any desired speed, started or stopped without requiring an attendant to be in proximity thereto.

The invention also embraces a highly efficient mechanism for transforming electrical into mechanical energy of simple yet effective construction having novel automatic means for effectively operating the mechanism which is locked in normal position, automatically released for action, electrically operated, then automatically stopped at a predetermined limit and eventually automatically returned to its normal initial position.

The invention also has for an object the provision of highly improved mechanical and electrically responsive means for transmitting motion step by step to any load and operating as stated.

The invention has for another object an improved system of control including a ratchet motor actuated by a solenoid in association with electro-responsive means to trip the ratchet motor to reset the same to its initial position.

Another object of the invention resides in a novel ratchet motor mechanism embodying torque multiplying means that can be remotely controlled and automatically operated and finally reset to its initial position.

The invention also includes as an object the use of a safety control mechanism for the mechanism and circuits which may be incorporated in the system as desired.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Referring to the drawings.

Figure 1:
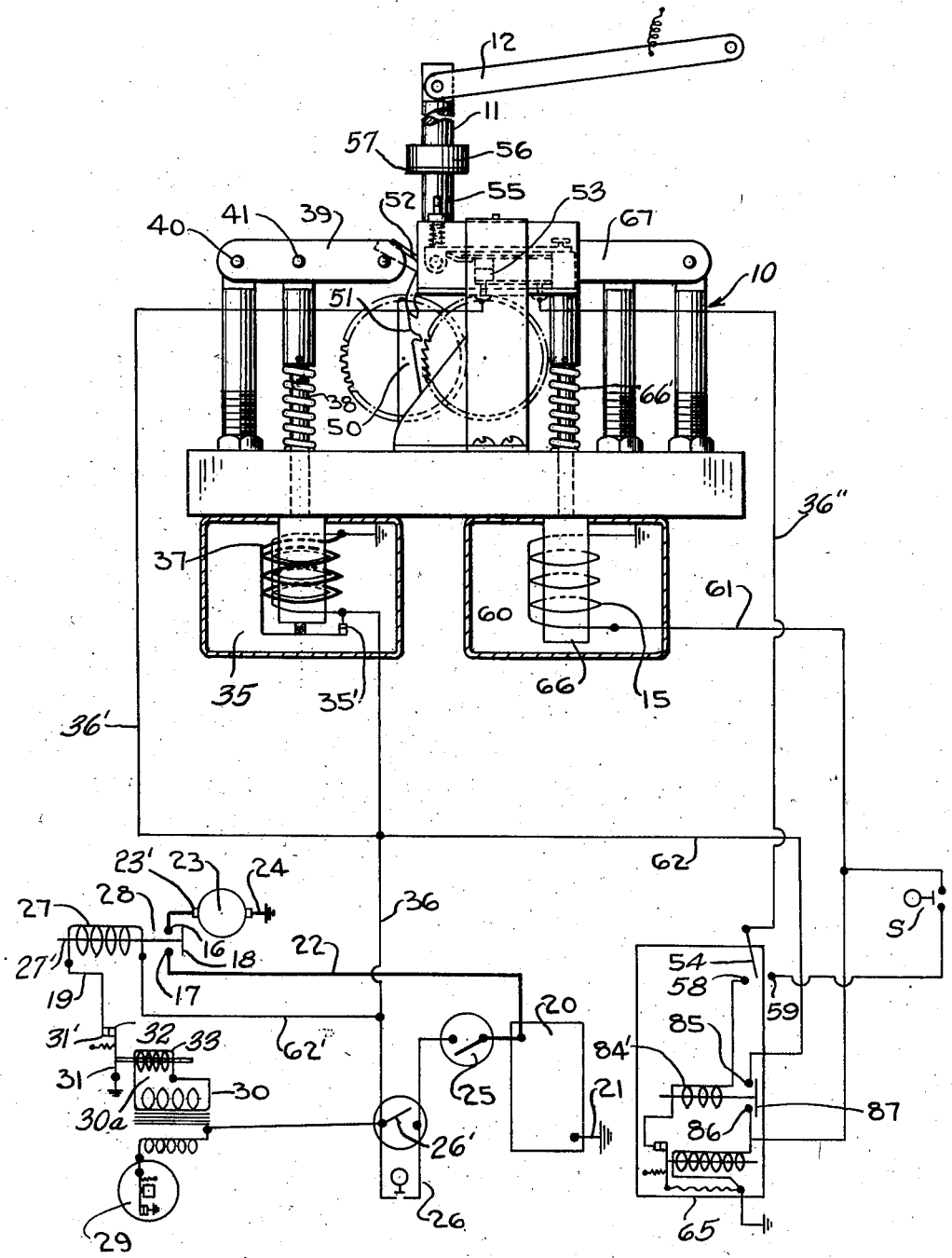
Figure 1 is a diagrammatic view illustrating one embodiment of my invention.

Referring to the embodiment of my invention illustrated in Figure 1, the solenoid operated ratchet type of mechanical motor is illustrated generally by the numeral 10, the same being connected by reciprocating rod 11 to be coupled at its upper end, as illustrated in Figure 1, with a suitable lever 12 or other means to be connected to a throttle, clutch, or any other mechanical device, and in the specific instance here shown may be used for opening and closing the throttle of a Diesel engine and I have also shown means for automatically starting and stopping the same.

The main operating solenoid 15 of the motor 10 is automatically operated from a source of electrical energy or power which in turn is under the manual control of the operator, the entire arrangement being such as to provide a mode of power such as the motor 10 capable of moving the rod 11 back and forth thereby actuating the lever to open and close the engine throttle and at the same time actuate the means for starting the Diesel engine. To this end I have provided a source of electrical energy such as the battery 20 grounded at 21 and connected by leads hereinafter more fully traced to the main operating solenoid, controlled by both main manual switch 25 and safety switch 26'. In case the motor 10 be used to start an engine as shown in Figure 1, the source of electrical energy or battery 20 is also connected by a suitable lead line 22 to an electrical starting motor 23 for starting such Diesel engine, said starting motor being grounded at 24 as shown. The manually controlled switch 25 is also in a circuit to control, through solenoid 27, the automatically controlled motor opening switch 28 to stop the engine starting motor 23, the control of the solenoid being connected with a make and break device 29, transformer or coil 30 and relay 31.

In the embodiment of the invention illustrated, the engine starting means are electrically actuated, but I contemplate the use of the invention to control engine starting means operated by other sources of power. The electrically actuated means shown are in the form of an electric starting motor 23 having suitable mechanical connections for cranking the engine and capable of being disconnected from the engine when the engine becomes self actuated. The electric starting motor 23 shown also has one of its terminals 23' connected by lead to one of the stationary contacts 16 of the electromagnetic motor switch 28 while the other switch contact 17 is directly connected by lead 22 to the battery terminal. The contacts 16 and 17 are bridged by a conducting bar 18 insulatingly carried by the magnetic core 27' which is surrounded by the energizing winding 27. One terminal of the switch winding 27 is connected by lead 62' to conductor 36, while the other terminal is connected by lead 19 to stationary contact 31' of the relay 30a.

The stationary contact 31' is adapted to be engaged by a contact 32 carried by the armature of the relay and is suitably grounded thereby. The terminals of energizing winding 33 of the relay 30a are connected respectively to the terminals of the secondary winding of the transformer 30, the primary winding of which is included in the circuit which receives the periodic current flow produced by the action of the oscillating or vibrating arm of the ignition make and break 29.

When it is desired to start the engine, it will only be necessary to close the main switch blade 25 and also ascertain that the safety switch 26 is in its closed position. When these conditions are present, solenoid 27 being energized, there is an operative connection from the live terminal of the battery 20 to the starting motor 23 for cranking the engine. At the same time a circuit is established for the flow of current from the battery 20 to the primary winding of transformer 30 and to the periodic current interrupting device 29 connected therewith. When the main Diesel engine, if used in the combination, becomes self active, the starting motor 23 becomes disconnected as usual and the automatically controlled motor switch 28 is arranged so that when the Diesel engine starts operating, the solenoid 27 releases the starting motor switch 28 and opens the starting motor circuit.

The ratchet motor 10 is actuated as stated by a pulsation action of the motor energizing solenoid 15 and to this end the fluctuations of current in solenoid 15 are controlled by an interrupter relay 65 later described. As the ratchet motor is locked in certain positions as will appear, I have shown herein a system in which the main switch 25 also controls the circuit to motor controlling or lock releasing solenoid 35 through lead 36 connected with lead 26, the main winding of solenoid 35 being grounded as shown. As hereinafter described, a light winding alone may be used for holding the solenoid in released position. The armature of this solenoid 35 is connected through a rod 38 to the pawl tripping lever 39 pivoted to a suitable post at 40 and pivotally connected at 41 to the solenoid plunger or rod 38. See also Figures 3 and 5.

The conditions under which the ratchet motor 10 is intended to be locked may be varied, as at full open position or otherwise all under control of the operator, and to this end a locking dog 50 has a projection 51 entering the ratchet teeth of the ratchet wheel 68 locking the same in a fixed position. A pivoted releasing catch which also forms the driving pawl 52 for the ratchet motor is adapted to be contacted by the arm 39 to release the locking dog 50 from contact with the ratchet wheel as indicated.

The controlling solenoid 35 is provided with a second or lighter winding 37 connected in the circuit as shown and is so designed to draw merely sufficient current from the battery to continually hold and free the locking dog 50 thereby freeing the driving pawl (52) in a release position until the rod 11 comes to the limit of its stroke as determined by the adjustable limit screw 55 when contacted by collar 56 and extension 57, which acts on a toggle type of make and break 53 shown in dotted lines in Figure 1 and extension 57 contacting the adjustable screw 55 and operating to open the make and break 53 breaks the circuit to the controlling relay and hence to the main operating solenoid 15.

The ratchet motor operating solenoid 15 is provided with a winding 60 grounded as shown and as indicated above is connected with lead 61 to the interrupter relay 65 which in turn is connected by a lead 62 through wire 36 to control switch 25 and battery 20. In Figure 1, the switch 54 may be thrown to the main relay operating contact point shown at 58 or to the other contact 59 for an auxiliary circuit through a hand switch s so that the solenoid might be operated manually if desired.

Figure 2:
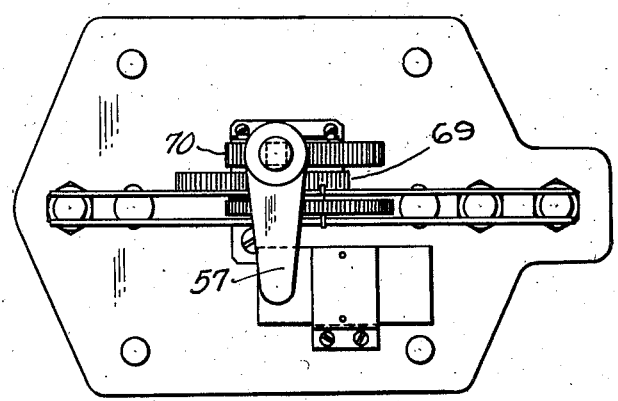
Figure 2 is a top plan view.
Figure 4:
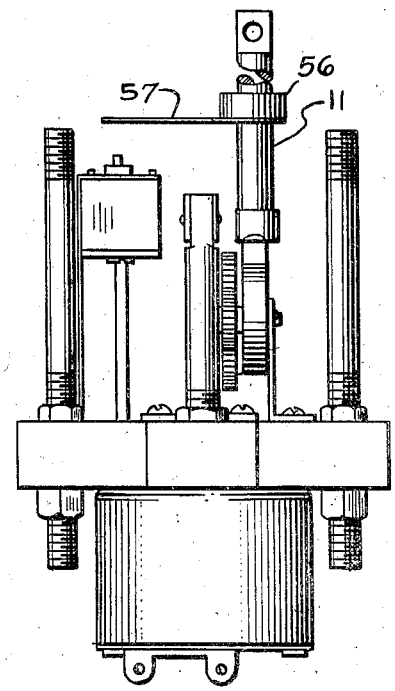
Figure 4 is an end view.
Figure 5:
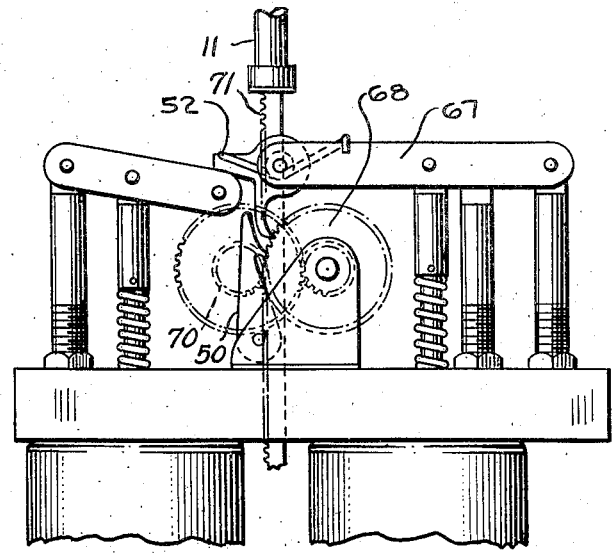
Figure 5 is a side elevational view similar to Figure 3 with the parts in a different position.

The relay is designated by the numeral 65. The plunger 66 of the solenoid 15 is pivotally connected at its outer end to the oscillating lever 67 connected as more clearly illustrated in Figure 5 with the power operating pawl 52 coacting with the ratchet teeth 68' on the ratchet wheel 68. The ratchet wheel 68 is in turn connected through power multiplying gearing 69 as shown in Figures 2, 4, and 5 to a spur gear or pinion 70 connected with rack or teeth 71 on the lever or rod 11 forming the means for operating the same from the ratchet motor 10.

A feature of the invention is to provide frequencies of impulses of the main solenoid 15 by reason of said interrupter relay 65, so that the operating coil 60 for the solenoid 15 will permit the solenoid plunger 66 to make a complete stroke with complete power and at proper frequencies depending upon the mechanical construction, weight of parts, etcetera, of the ratchet motor, levers, gears, etcetera, and other load. To this end the interrupter relay 65 diagrammatically illustrated in the embodiment of Figure 1 may be of the type shown more in detail in Figure 6, and as the specific type illustrated in Figure 6 may be used at 65 in Figure 1, reference to Figure 6 will now be had for a more complete description of the particular inertia delay interrupter relay there illustrated.

Figure 6:
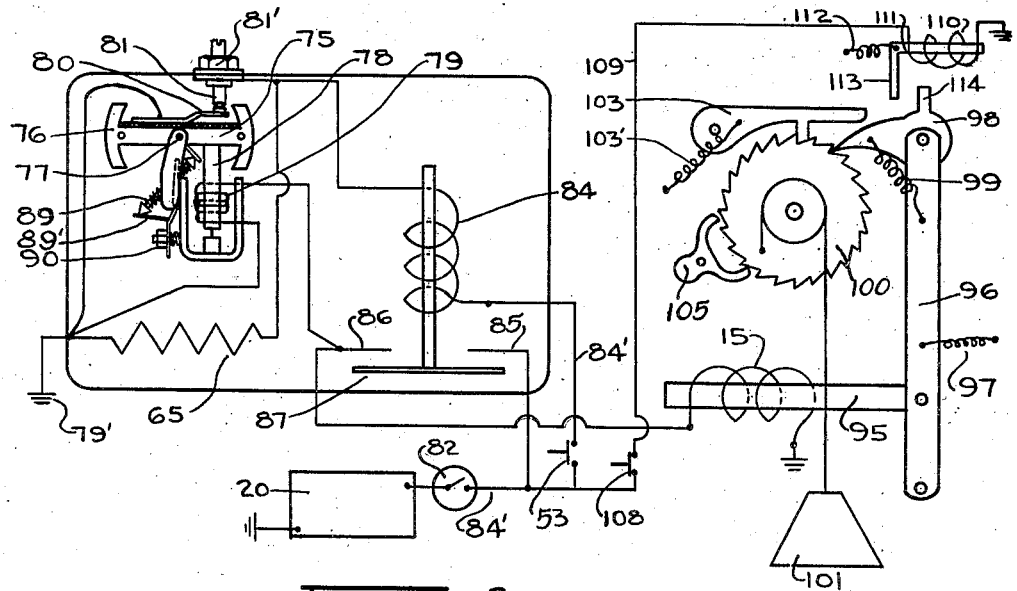
Figure 6 is a diagrammatic view illustrating another controlling system or electro-responsive means for actuating prime mover elements and shown in combination with a different type of prime mover or mechanical means.

In Figure 6 the switch contacts of the relay are arranged to be opened and closed by the balancing of an operating coil against the weight of the mechanism holding the movable switch element, and I have there illustrated a balanced arm 75 having weights 76 attached thereto. The balanced arm is pivoted in a bearing at 77 and carries a hinged plunger 78, which is actuated by the relay interrupter coil 79 when the latter is energized, causing the contacts 80 and 81 to open. The battery 20 is connected through battery switch 82, lead 84' and operating switch 53 to coil 84 and through leads to contacts 80 and 81 hence to ground, the latter terminal being grounded. The closing of switch 82 energizing coil 84 is also arranged for actuating the contact switch 87 which, as illustrated, controls contacts 85 and 86 in the main circuit to the ratchet motor operating solenoid 15, and the making and breaking of this circuit causes the pulsations in the current through the solenoid 15 as will be readily understood by those skilled in the art. The coil 79 as shown in Figure 6 is connected by suitable leads to the contact 86 and grounded at 79' as shown. When coil 79 is energized it will break contacts 80 and 81 by the solenoid action on the plunger 78 resulting in the opening of the circuit of coil 84 which in turn opens the circuit of the solenoid coil 15 of the ratchet motor as clearly understood.

The particular means I have provided for controlling the frequency of the impulses of this main solenoid circuit through the interrupter relay will now be described. In addition to the balanced arm 76 an adjustable spring toggle mechanism 89 is arranged in conjunction with said balanced arm 75, the toggle spring 89' having an adjustment 90 to increase or decrease the tension and hence the return action of the balanced arm 75. By mounting the contact 80 on the flexible leaf as illustrated, this contact has a certain amount of travel motion which will depend upon the action of the parts according to the balance and adjustment of the spring toggle.

The other contact 81 is also mounted on an adjustable screw 81' so that the stroke of opening and closing the contacts may be varied thereby. The relay switch through contacts 80 and 81 is opened by the coil 79 and closed by the return of the weighted arms 76 and spring toggle 89. As stated, the mechanism illustrated provides an adjustment at 90 for the toggle 89 as well as the adjustment of the weights 76 so that the frequency of the operation of the circuit breaker or relay may be thereby controlled. I have provided in one practical embodiment of my invention an arrangement of the parts so that the mechanism is adjustable from 1 to 30 contacts per second, but by different arrangements of the spring tensions, current pull, and various weights, other frequencies can be obtained to inject different time delays in opening and closing for the main solenoid operating relay switch 65.

In the application as shown, as long as operating switch 82 in Figure 6 or 25 in Figure 1 is held closed, the ratchet motor would operate at the frequency set by the relay interrupter. Releasing the limit switch 53 would stop the ratchet motor and leave the pawls engaged to lock the work done in that position.

In the entire embodiment of my invention illustrated in Figure 6, the inertia delay interrupter relay heretofore described is used for energizing the operating solenoid 15 in conjunction with a different ratchet motor compared with the motor of Figure 1 to produce work of a different character. In Figure 6 the motor may be used, for example, for the purpose of raising and lowering a window and the mechanism may be manually controlled from the starting switch 82 and otherwise automatically operated by the combined electromagnetic ratchet motor disclosed. The ratchet motor illustrated in Figure 6 includes a plunger 95 operated by the solenoid coil 15 as in the embodiment illustrated in Figure 1, the plunger 95 being pivotally connected to a pivoted lever 96 operated against a spring 97. Carried at one end of lever 96 is an operating pawl 98 operating against the spring 99, said pawl engaging the ratchet teeth of the ratchet wheel 100. In this instance the work to be performed is illustrated by pulley and weight 101. As in the other embodiment, there is provided a locking dog 103 urged by spring 103' into locking connection with the ratchet teeth. The release of the dog 103 may be effected by using the operating dog 98 as in the other embodiment and to this end I have illustrated the use of a trip lever controlled by a suitable solenoid arranged in a circuit connected with the battery through the release control switch 108, the circuit 109 connecting the coil 110 to ground as illustrated. The coil 110 surrounds and operates plunger 111 which acts against the action of the spring 112 as illustrated and plunger 111 after a right angle contacting arm 113 adapted to coact with the projection 114 on the operating pawl 98 as illustrated so that when the coil 110 is energized the plunger 111 will be pulled to the right as illustrated in Figure 6 causing contact arm 113 to release the pawl 98 through its action on the projection 114. It will therefore be seen that should it be desired to return the weight 101, illustrating the work done, to its original position the release switch 108 may be closed whereupon the energization of coil 110 would release the ratchet holding dog 103 as stated, thereby permitting the ratchet to operate in the reverse direction due to the load, the operation of which can be stopped at any point by the operator releasing the switch 108 which open circuits the solenoid coil 110. It will be noted that I have provided in the embodiment of Figure 6 a diagrammatic illustration of means to control the speed of the return through an escapement mechanism illustrated at 105.

Figure 7:
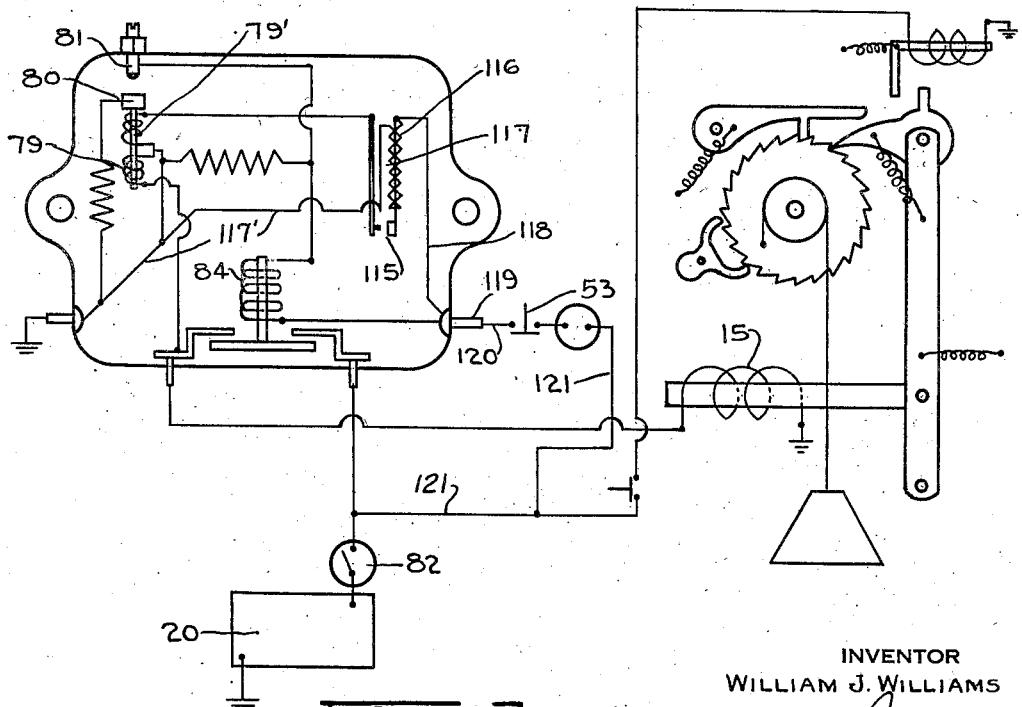
Figure 7 is a diagrammatic view of an embodiment of my invention utilizing in Figure 7 a safety control in type of mechanical means and electrical system illustrated in Figure 6.

In the embodiment of the invention illustrated in Figure 7 I have provided a safety device in the circuit in order to prevent damage to the system and particularly to the ratchet motor in case of any accidental stalling in the operation of any of the parts of the mechanism before the limit switch is opened.

The ratchet type of motor and the operating circuits therefor substantially as illustrated in Figure 6 are also employed in Figure 7, excepting that a thermostatically operated switch 115 is interposed in the battery interrupter relay to ground circuit. This thermostatically operated switch includes the provision of the bi-metallic leaves 116 which in turn are provided with a winding 117 which constitutes a heating coil. This winding 117 is in a circuit connected with the battery 20 (grounded as shown), switch 82 through leads 121, limit switch 53, lead 120, terminal 119, lead 118, leads 117' to ground. It is understood that the heating coil 117 is suitably grounded by wire 117' and is so designed that after approximately 20 seconds, for example, or after the limit switch 53 should have opened in say 15 seconds, then the heating coil 117 will build up sufficient heat to cause the bi-metallic leaf to warp over and close the contacts of the switch 115 thereby completing the battery circuit to a secondary winding 79' of the interrupter relay controlled by the coil 79 as in the circuit arrangement illustrated in the embodiment of Figure 6. This coil 79' is arranged when so energized to hold open the interrupter switch contacts 80 and 81 and the same will remain open as long as the thermostatic switch 115 is in closed position. It will, of course, be understood that the holding of the interrupter relay contacts 80 and 81 in open position completely de-energizes the main operating solenoid 15 (because coil 84 is thereby deenergized) as in the embodiment of Figure 6, and this, of course, prevents further operation of the ratchet motor, Figure 7 illustrating the same type of motor as illustrated in Figure 6. To those skilled in the art, it will be understood that the bi-metallic leaves of the thermostatic switch as here illustrated are employed to compensate for changes in the ambient temperature and that from the foregoing description of Figure 7, if for any reason the system stalls, the current in coil 117 will heat up the thermostat leaves 116, cause the switch 115 to close, and continuously energize the auxiliary or secondary operating coil 79', maintaining breaker points 80 and 81 in open position until the difficulty has been remedied by the operator.

*Operation*

Referring to the embodiment of Figure 1, when the battery switch 25 is manually closed, circuit will be established through the lead 22 (by coil 21) to the starting motor 23 which will automatically turn over the engine with which the starting motor is connected and the circuits are arranged as will be readily understood so that when the engine begins to fire the starting motor circuit will be automatically disconnected by reason of switch 28, solenoid 27 connected in circuit with the make and break device 29, the induction coil 30 and switch 31, the same corresponding to the arrangement shown in my Patent No. 2,319,835, dated May 25, 1943, of which this application is a continuation in part. It will be seen that the opening of the switch 31 will de-energize holding coil 27 and release the switch 28 of the starting motor 23 when the main engine begins to operate.

*Sequence of operation of ratchet motor and electrical controls*

Figure 3:
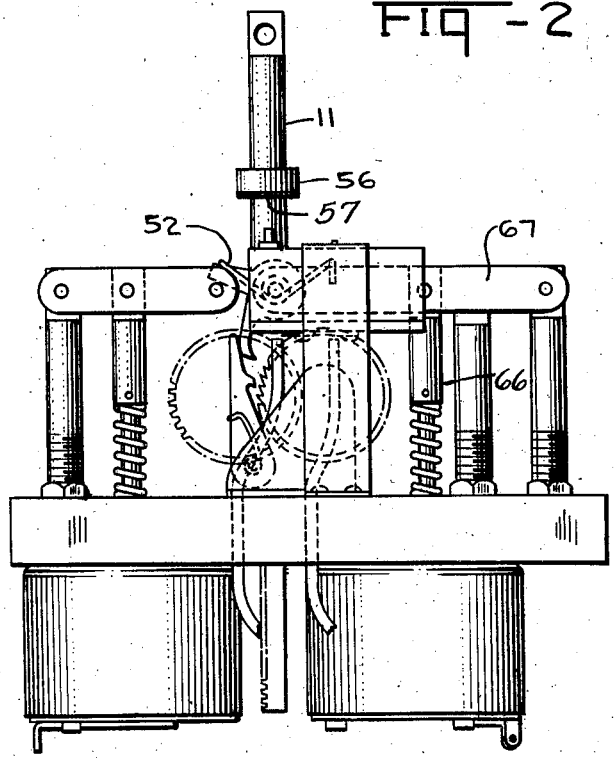
Figure 3 is an elevational view of the controlling and operating solenoid for the step-by-step mechanism of Figure 1.

The fundamental feature of the present invention involves the solenoid motor illustrated at the top of Figure 1 used with a type of relay such as that illustrated in Figure 6 (65 in Figure 1). The sequence of the steps of operation are as follows:

1. Manually closing the main circuit switch 25 energizes releasing coil 35 to move the dog 50 and pawl 52 from the position shown in Figures 1 and 3 to the position shown in Figure 5.
2. At first, current passes through both windings in coil 35 but as soon as the plunger is pulled down, the light holding winding alone is sufficient to hold the parts in released position (the heavy winding circuit is broken at the switch 35').
3. Closing main switch 25 permits current from battery 20 to pass through leads 25, 36, 36', limit switch 53 which is closed, lead 36'', to relay 65 (lead 36'' corresponding to lead 84' for switch coil 84 of Figure 6).
4. Current is thus supplied through lead 61 to the operating coil 60 of the main solenoid 15 at periodic intervals pumping the same up and down as it is returned by the weights of the parts and the spring 66'. This operates the ratchet pawl 52 to move the pawl wheel around one tooth for each stroke. (See parts as in Figure 5.)
5. The power multiplying gearing 69 transmits this rotation to the rack pinion 70 (see Figures 2 and 5).
6. The pinion 70 operates on rack 71, which is connected with the main reciprocating rod 11, which in turn, in Figure 1 is connected with the engine throttle control 12, pulling the rack 71 and rod 11 downwardly in Figure 1, the spring on lever 12 returning it to normal position.
7. The limit switch 53 is finally broken when extension 57 contacts pin 55 thereby breaking the main operating circuit from the battery 20 to the relay 65 for the solenoid 15.
8. The mechanism then stays in this position until the main holding circuit 36 is broken either by hand, by opening the switch 25, or automatically by a thermostat arrangement such as shown in the relay combination and thermostat switch shown in Figure 7.
9. When the holding winding for the solenoid 35 is finally broken it will be clearly seen from Figure 1 that the spring surrounding the plunger 38 will permit the lever 39 to rise and return from the position shown in Figure 5 to initial position as shown in Figures 1 and 3 thereby releasing pawl 52 and holding dog 50. This will permit the spring shown at the top of lever 12 in Figure 1 to return the rack upward to its normal position, and all parts of the mechanism will then be in their initial positions ready for repeated use by again closing switch 25.

Considering the operation in detail, the main circuit is from battery 20 (grounded as shown), switch 25, lead 26, lead 36, lead 36' to the time limit switch 53, return lead 36'', switch 54, to relay 65. It is by alternately closing and opening the switch blade 87 to contacts 85 and 86 that lead 61 from grounded solenoid 36, and then to the battery 20 or other source of power.

Referring to Figure 6, when the switch 82 (25 of Figure 1) and the limit switches 53 is also closed, current from the battery 20 flows through the switch 82 (25), line 84', coil 84 of the switch 87, to the terminal 81. From there, it passes through engaged contacts 81 and 80 through the conductors shown and to ground 79'.

This closed circuit energizes the coil 84 to attract the plunger thereof against the action of its weight (or a spring) to cause contact 87 to engage the contacts 85 and 86. Then current is built up to a value in the coil 79 of the relay which can attract the plunger 78 into the coil against the moment of inertia of the lever 75 and the action of the toggle pin spring 89'.

With the lever construction described, the pulsations of the current as it passes through the coil are ineffective to cause a fluttering of the lever 75 due to the moment of inertia of said lever. As soon as the current value builds up in said coil, this overcomes the action of the air gap and the plunger is attracted into the coil. The lever 75 then swings clockwise (as shown) around its pivot 77 to cause the contact 80 to leave the contact 81. This breaks the circuit for the coil 84 of the magnetic switch which then becomes deenergized. The contacts at 85 and 86 are thus broken, breaking the circuit through the coil 79, to thereupon permit the lever 75 to swing back counterclockwise to its original position again closing the circuit at the contacts 81 and 80 whereupon the action will be repeated.

It is pointed out at this time that by means of the adjustment afforded by the contact 81 and by the nut on the screw or stud 90 of the relay, the frequency of the operation of the relay may be varied, regulated or controlled.

In using the interrupter relay so illustrated and indicated at 30a herein, it is important to note that the ratio of turns between the primary and secondary windings of the transformer 30 is such that when the engine is running under its own power or at any speed above cranking speed, the alternating current induced in the secondary winding should be of sufficient value to energize the relay winding so as to keep apart the contacts 31'. However, when the periodicity of the interruption of the breaker 29 falls below such predetermined value or the engine speed is below cranking speed, which may take place when the engine stalls, the value of the alternating current induced and flowing through the relay winding should be insufficient to overcome the force of the spring so that when such condition takes place, the armature contact 31 will be urged into engagement with the stationary contact, thus reestablishing the connection of the electro-magnetic switch energizing winding 27 to move the connecting bar 18 with the switch contacts to cause the energization of the starting motor 23 from the battery 20 for cranking the engine through circuit 22.

It is to be understood of course as heretofore indicated that the toggle action type of relay illustrated in Figure 6 may be used in the embodiment of the invention incorporated in Figure 1, a detailed explanation of the operation of said toggle action having been indicated above.

Due to the pulsations in the current in the winding 60 of the solenoid motor 15, the plunger 66 will be reciprocated by the action of the spring and the pull of the solenoid oscillating pivoted lever 67 and thereby the pivoted working pawl 52 against the ratchet teeth 68' of the ratchet wheel 68 to revolve the same. The holding dog 50 is arranged at this period (see Figure 5) to ride on the teeth of the ratchet wheel and consequently hold it in its most advance position at any time. It will be clear that the ratchet wheel 68 is connected to the gear multiplying gear set 69 to revolve spur gear operating on the teeth on the rack of the lever 11 which is to be connected at its end 12 with a throttle of a Diesel engine, for example, to operate the same. It is to be understood that the weight of the parts or the spring as indicated in Figure 1 are employed to normally urge the rod 11 in the opposite direction against the action of the rack and pinion.

The circuit to the ratchet operating motor solenoid 15 is automatically broken by the ratchet motor when the rod 11 moves to its downwardmost position as illustrated in Figure 1, the limit switch adjustment finger 56 at that time contacting the plunger 55 shown in Figure 1, opening the switch contacts 53 which are arranged in the main circuit between the interrupter relay 65 and the working solenoid 15. It will be understood that the current passing through the auxiliary winding of the solenoid 35 is finally broken (as when main control switch 25 is opened) and this permits the pawl 52 and holding dog 50 to remain in the drive teeth 68' of the ratchet teeth 68 holding the throttle operating rod 11 in open position.

With this construction a very strong torque can be applied to the lever pull rack or rod 11 by reason of the gear multiplying gear set 69 which may be of conventional back gearing type and it is evident that there would be no limit to the length of the stroke which could be established. The speed or movement can be regulated by the adjustment of the interrupter relay 65 varying the pulsations on the operating solenoid 15 and in this connection the gear ratio established by the back gearing could be determined according to the required load. This lever control mechanism therefore offers a wide range of application where heavy pull is required for intermittent service employing the use of conventional solenoids and arranged to require a minimum amount of current draw. It is evident that the construction of the motor is simple and very compact.

As to the embodiment illustrated in Figure 6, the operation will be readily understood from the foregoing and the description of the circuits and mechanism heretofore given. In Figure 6, 82 is the battery starting or connecting switch corresponding to the switch 25 of the embodiment of Figure 1 at least insofar as establishing the main circuit to the ratchet operating motor solenoid 15 is concerned. In Figure 6 the interrupter relay is employed to cause the pulsations in the ratchet motor solenoid 15 as will be understood from the foregoing. Switch 82 which may be manually operated closes the circuit from the source of energy, battery 20, to the solenoid 15 through the interrupter relay. The action of the interrupter relay has been described above where it has been pointed out that the frequency of pulsations may be varied by adjusting the various parts such as weights 76 and adjusting the screw nut 90 of the toggle spring return action.

Oscillations of the solenoid 15 reciprocate plunger 95 and consequently oscillate pivotal lever 96 against the action of the spring 97 as illustrated. This causes the working dog 98 to rotate the ratchet wheel 100 in a direction to raise the weight 101 as diagrammatically illustrated for the load in Figure 6. As long as the operating switch is held closed, the ratchet motor operates and will operate at the frequency set up by the motor relay until the operator releases the operating switch 82. This will stop the action of the motor and permit the holding dog to engage and lock the ratchet wheel in a fixed position as desired. As heretofore indicated, if the release switch 108 is closed, the locking dog 103 will be released by reason of the energization of coil 110 and the parts will be automatically returned to original or starting position or any such position as desired by the operator as long as the release position is held closed.

In the embodiment illustrated in Figure 7, the action of the thermostat 117 will be readily understood from the foregoing description as controlling an opening of the main circuit to the motor operating solenoid 15 in case the interrupter circuit stays closed too long indicating a stalling of the operation of the ratchet motor or other parts of the mechanism connected therewith.

In the embodiment of Figure 6, the interrupter relay and make and break through contractor 87 involves a control which consists of two relays working together, each of which breaks the circuit to the other and principles of which have been revealed in my previous cases and which will be understood from the drawings by those skilled in art.

What I claim is:

1. In a mechanism for controlling and actuating a mechanical prime mover which has a reciprocating element; an electrically responsive means including an operating solenoid for intermittently actuating said reciprocating element; a manually controlled circuit for said solenoid connected with a source of electrical energy; an interrupter relay in said circuit; locking means for said prime mover; electro-responsive means to release and hold in released position said locking means; an electrical circuit therefor; automatic means controlled by said prime mover for disconnecting said operating solenoid from said circuit and means for opening the circuit of said electro-responsive lock releasing means and a manual switch in said solenoid circuit for actuating said motor solenoid step by step.

2. In an electro-mechanical controlling and actuating mechanism constituting an automatically controlled prime mover; a reciprocating element; an operating solenoid for intermittently actuating said reciprocating element; a manually controlled circuit therefor connected with a source of energy; an interrupter relay in said circuit arranged to periodically open and close said circuit; adjustable means to vary the periodicity of said interrupting relay; automatic means controlled by said prime mover for disconnecting said operating solenoid from said circuit; and additional automatic means dependent upon delayed operation of said solenoid motor for opening said solenoid circuit.

3. In an electro-mechanical controlling and actuating mechanism constituting an automatically controlled prime mover; a reciprocating element; an operating solenoid for intermittently actuating said reciprocating element; a battery; a manually controlled circuit for connecting said solenoid with said battery; an interrupter relay in said circuit arranged to periodically open and close said circuit; and means to vary the periodicity of said interrupter relay; locking means for said prime mover; electro-responsive means connected with said battery to release and hold in released position said locking means; automatic means controlled by said prime mover for disconnecting said operating solenoid from said circuit and means for rendering said electro-responsive lock releasing means ineffective.

4. In a mechanism for controlling and actuating a mechanical prime mover which has a reciprocating element; an electrically responsive means including an intermittently operated solenoid for intermittently actuating said reciprocating element; a battery; a manually controlled circuit for connecting said solenoid with said battery; an interrupter relay in said circuit for causing said intermittent operation thereof; and a thermostatically controlled switch arranged to open said solenoid circuit dependent upon a continuous flow of current in said intermittently operated solenoid circuit.

5. In a mechanism for controlling and actuating a mechanical prime mover which has a reciprocating element; an electrically responsive means including an intermittently operated solenoid for intermittently actuating said reciprocating element; a manually controlled circuit for said solenoid connected with a source of electrical energy; an interrupter relay in said circuit for causing an intermittent flow of current in said solenoid circuit, said relay having a main operating coil and a make and break operated thereby; thermostat switch located in said solenoid circuit; an auxiliary winding in said interrupter relay; and connections between said thermostatic switch and said auxiliary winding whereby a continuous flow of current in said solenoid circuit operates through said switch and auxiliary winding to hold the make and break of said relay in open position.

6. In a mechanism of the class described, a reciprocating element; an operating solenoid for intermittently operating said reciprocating element; a pawl operated by said reciprocating element; a ratchet wheel operated by said pawl; power multiplying gearing connected with said ratchet wheel; a pinion adapted to be operated by said power multiplying gearing; a rack adapted to be operated by said pinion; an electric circuit adapted to be connected with a source of energy and with said solenoid; a relay in said circuit for controlling the operation of said solenoid to intermittently operate said element; and manually controlled means for controlling said circuit.

7. In a mechanism of the class described, a reciprocating element; an operating solenoid for intermittently operating said reciprocating element; a pawl operated by said reciprocating element; a ratchet wheel operated by said pawl; power multiplying gearing connected with said ratchet wheel; a pinion adapted to be operated by said power multiplying gearing; a rack adapted to be operated by said pinion; an electric circuit adapted to be connected with a source of energy and with said solenoid; a relay in said circuit for controlling the operation of said solenoid; means for varying the periodicity of said relay; and manually controlled means for controlling said circuit.

8. In a mechanism of the class described, a reciprocating element; an operating solenoid for intermittently operating said reciprocating element; a pawl operated by said reciprocating element; a ratchet wheel operated by said pawl; power multiplying gearing connected with said ratchet wheel; a pinion adapted to be operated by said power multiplying gearing; a rack adapted to be operated by said pinion; an electric circuit adapted to be connected with a source of energy and with said solenoid; a relay in said circuit for controlling the operation of said solenoid; manually controlled means for controlling said circuit; and a limit switch controlled by said rack for opening said circuit.

9. In a mechanism of the class described, a reciprocating element; an operating solenoid for intermittently operating said reciprocating element; a pawl operated by said reciprocating element; a ratchet wheel operated by said pawl; power multiplying gearing connected with said ratchet wheel; a pinion adapted to be operated by said power multiplying gearing; a rack adapted to be operated by said pinion; an electric circuit adapted to be connected with a source of energy and with said solenoid; a relay in said circuit for controlling the operation of said solenoid; manually controlled means for controlling said circuit; and thermostatically controlled means for opening said circuit.

WILLIAM J. WILLIAMS.